A. E. MEYER & F. WETTEROTH.
HANDLE.
APPLICATION FILED NOV. 21, 1910.
1,025,416. Patented May 7, 1912.
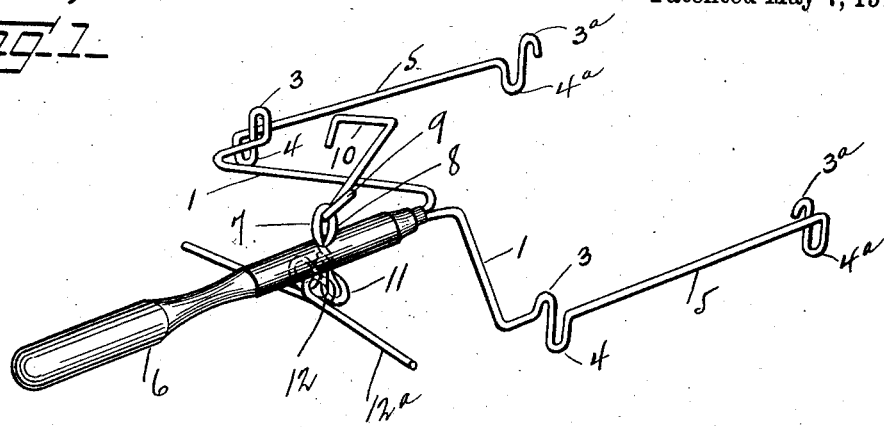
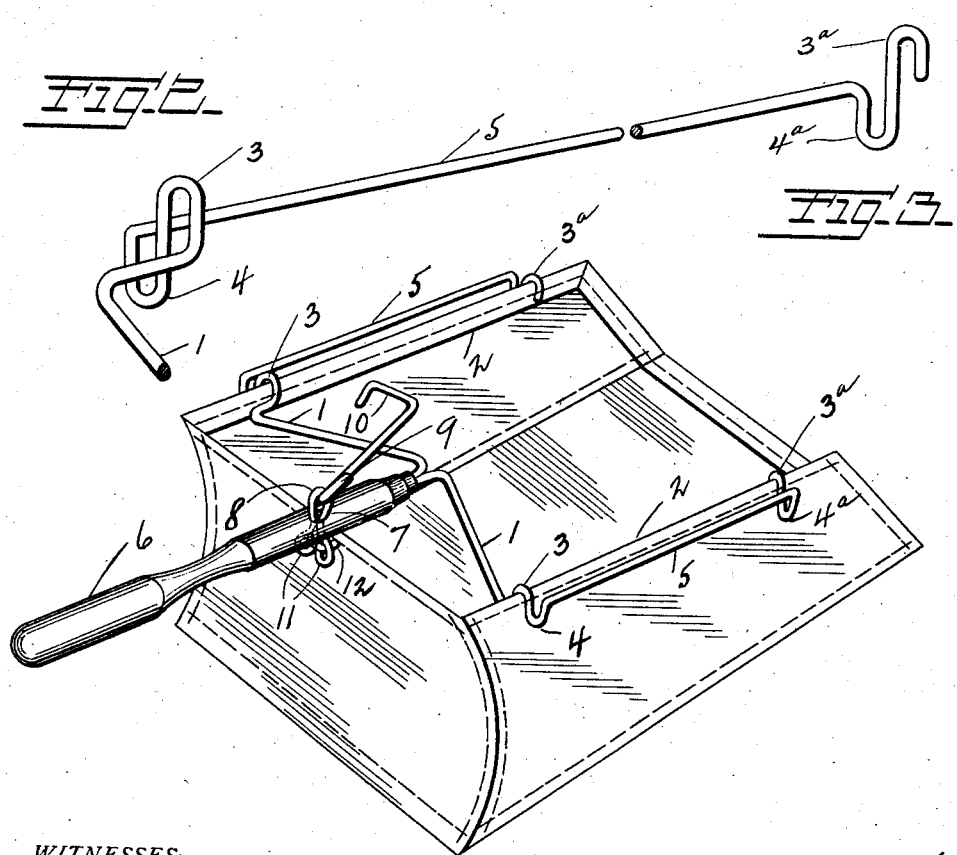
WITNESSES:
Chas. A. Becker
Thomas Erskine
INVENTORS:
Adolph E. Meyer and
Frank Wetteroth.
By Small & Small
ATTORNEYS.

UNITED STATES PATENT OFFICE.

ADOLPH E. MEYER, OF WEBSTER GROVES, AND FRANK WETTEROTH, OF ST. LOUIS, MISSOURI.

HANDLE.

1,025,416. Specification of Letters Patent. Patented May 7, 1912.

Application filed November 21, 1910. Serial No. 593,476.

*To all whom it may concern:*

Be it known that we, ADOLPH E. MEYER and FRANK WETTEROTH, citizens of the United States, and residing, respectively, in Webster Groves, in the county of St. Louis, State of Missouri, and in the city of St. Louis, State of Missouri, have invented a new and useful Handle, of which the following is a full, clear, and exact specification.

This invention relates to handles of general application, but which are particularly adapted for use upon baskets and those other receptacles termed grass-catchers which are detachably disposed to the rear of a lawn mower; and the prime objects of said invention are (a) to provide a combined handle, guard, and brace, and (b) to afford such an article which is comparatively inexpensive, simple and light in construction, and easy of application. These desiderata, and others hereinafter to be noted, are attained through the features illustrated in the accompanying drawing, in which—

Figure 1 is a perspective of our completed handle; Fig. 2 a detail, on slightly enlarged scale, of certain important features thereof; and Fig. 3 the application of the handle to a receptacle termed a grass catcher, said receptacle being merely diagrammatically illustrated.

Throughout the several views like numerals refer to like parts.

In practice, a length of suitable material, preferably spring steel or wire, is formed into diverging arms 1, said arms being carried to a point normally interior of and adjacent to the rim, edge or frame 2 of the receptacle selected and there doubly crimped into eyelets 3 and 4, the latter prolonged into guard-rods 5 which terminate in specially formed eyelets $3^a$, $4^a$ duplicating the formation of eyelets 3 and 4. The free ends of arms 1 are suitably engaged with a comparatively long, slender handle 6 which, in use upon a grass-catcher, lies beneath the handle of the lawn mower, and vertically through the center of the handle 6 is directed a deep U-shaped device or narrow staple 7 whose loop 8 is engaged with eyelet 9 of a supporting member 10 and whose free ends 11 are, preferably, directed through and thence rebent over an eyelet 12 provided in the center of the upper rear bar $12^a$ of the grass-catcher frame. From their location considerably above eyelets 4, $4^a$ it will be noted that eyelets 3, $3^a$ can be secured upon the receptacle frame without disturbing guard-rods 5, and it will be further remarked that all of said eyelets are disposed substantially at right angles to said guard-rods and that the latter are arranged parallel, external and adjacent to the portion of said receptacle engaged by said eyelets.

Commercially, our forms of handle have, among other advantages three (3·) of prime importance in contrast to their nearest approach in the art, to wit:—(1) those heretofore presented are not handles of general application, but are confined by their construction to one type or class of receptacle; (2) they have but a single point of engagement with the opposite sides of the receptacle to which they may be applied, and that engagement in the form of single eyelets disposed at the ends of long and slender wires; and (3) they do not serve as a guard to the frame of the receptacle, nor brace the same, nor impart rigidity thereto.

Obviously, the earlier handles referred to while probably satisfactory where light loads are to be carried, utterly fail when the basket, sack or other receptacle used contains a heavy load, for in that event the wire of the handle extending from the frame, edge, top, or rim of the receptacle to the hand-grip will be bowed, bent, or broken; and, moreover, our device is purposely designed to serve, not only as a brace for the frame and a means for imparting rigidity thereto, but, additionally, as a guard and reinforcement, and these several offices it fulfils through having five (5) separate and distinct points of engagement with the receptacle frame, rim, or edge, and, also, through the arrangement of its guard-rods 5 parallel and adjacent to and beyond or external of said frame, rim, or edge. By the provision of the last mentioned feature, laterally directed knocks, contacts, or blows apt to be received by all receptacles, particularly baskets, grass-catchers and the like, are sustained by rods 5, in consequence of which the frame proper and the comparatively delicate canvas or other material normally depending therefrom are protected from damage.

Being constantly employed in the wire-working industry and, hence, skilled therein, we are well aware of many patented handles of both general and restricted application and of handles used in combination with receptacles of different types and character, but, having these things in mind, we are not aware that our improvements, before described and to be particularly pointed out in the appended claims, have been anticipated.

What we claim as new and desire to secure by Letters-Patent, is:—

1. A receptacle handle comprising a portion affording a hold for the hand, arms oppositely diverging from said portion, a plurality of crimps in each of said arms, rods spacing and in continuity with said crimps, a member vertically directed through said hand-hold, and a supporting device, said crimps arranged to engage the rim, edge or frame of a receptacle and normally secured thereupon, said rods being disposed parallel and adjacent to that portion of said receptacle engaged by said crimps, an extremity of said member engaging said device, the opposite extremity of said member engaging a portion of said receptacle different from that portion thereof engaged by said crimps.

2. A receptacle handle comprising a portion affording a hold for the hand, arms oppositely diverging from said portion, a plurality of crimps in each of said arms, rods spacing and in continuity with said crimps, a member vertically directed through said hand-hold, and a supporting device, said crimps arranged to engage the rim, edge or frame of a receptacle and normally secured thereupon, said rods being disposed parallel, external and adjacent to that portion of said receptacle engaged by said crimps, an extremity of said member engaging said device, the opposite extremity of said member engaging a portion of said receptacle different from that portion thereof engaged by said crimps.

ADOLPH E. MEYER.
FRANK WETTEROTH.

Witnesses:
J. H. HAMILTON,
PAUL GROSSE.